United States Patent [19]

Hesse

[11] 3,753,209
[45] Aug. 14, 1973

[54] CURRENT DISTRIBUTOR RAIL
[75] Inventor: Kurt Hesse, Lemgo-Lippe, Germany
[73] Assignee: Staff & Schwarz GmbH, Lemgo-Lippe, Germany
[22] Filed: Jan. 5, 1971
[21] Appl. No.: 104,105

[52] U.S. Cl. .............................. 339/21 R, 339/24
[51] Int. Cl. ............................................. H01r 13/60
[58] Field of Search ........................... 339/14, 20–24

[56] References Cited
UNITED STATES PATENTS

| | | | |
|---|---|---|---|
| 3,546,367 | 12/1970 | Hart | 339/21 R |
| 3,061,810 | 10/1962 | Boyd | 339/22 |
| 2,680,233 | 6/1954 | McFarlin | 339/21 R |
| 3,496,518 | 2/1970 | Neumann et al. | 339/21 R |
| 3,605,064 | 9/1971 | Routh et al. | 339/21 R |
| 3,622,938 | 11/1971 | Ito et al. | 339/21 R |
| 3,649,951 | 1/1973 | Routh et al. | 339/21 R |

Primary Examiner—Marvin A. Champion
Assistant Examiner—Robert A. Hafer
Attorney—Sughrue, Rothwell, Mion, Zinn & Macpeak

[57] ABSTRACT

A current distributor rail for current consumers such as lamps, electrical appliances or the like including a rail member adapted to be severed to any required length and having a constant cross-section over its whole length, the rail member defining a receiving space for an adapter which is open at one end of the rail member, the receiving space having two opposite fixing grooves extending over the whole length of the rail for adapter mounting, at least two oppositely located electric conductors extending over the whole length of the rail and, at least one earthing conductor the earthing conductor being accessible for tapping current from the receiving space and a cover means located at each end face of the rail member and covering the conductors to make them inaccessible.

8 Claims, 8 Drawing Figures

Patented Aug. 14, 1973

CURRENT DISTRIBUTOR RAIL

The present invention concerns a current distributor rail for current consuming devices such as lamps or other electrical apparatus, comprising at least two electric conductors and at least one protective conductor.

It is an object of the invention to provide a current (shockproof) distributor rail which is fitted with current conductors inaccessible from all sides and hence electrically safe.

A further object of the invention is that the current distributor rail is adapted to be cut to any required length, the exposed current conductors at the end face being rendered shockproof; furthermore the current distributor rail is functional over any severed length.

A further object of the invention resides in an economical production of the current distributor rail and its shockproof structure.

A further object is to produce a rail which is stable, of compact structure and easy to mount.

In a preferred embodiment, the current distributor rail is severable at any length and still functionable. It has a constant cross-section over its whole length and defines a receiving space on the open longitudinal side of the rail for an adapter, the space having two opposing fixing grooves extending over the whole length of the rail. The electric conductors also extend over the whole length of the rail, with at least one earthing or protective conductor, all conductors being accessible for tapping current from the receiving space. Each end face has at least one cover means covering the conductors to render them inaccessible (shockproof), the basic form of the covers corresponding to the cross-section of the rail.

As cover means a cap is preferably provided, the cap being located at each end face of the rail section (current distributor rail) by means of a socket connector having fixing projections engaging in recesses on the end face of the rail section and adapted to be detachably located thereon. The cover means may also be formed by a cover member welded or cemented to the end face of the rail section.

Furthermore both cover means of a rail may be fitted with alternatively (diagonally) opposite fixing ribs projecting into the receiving space of the rail, the ribs providing positional location for an adapted in a butt end of the rail.

Preferably the current distributor rail is formed from a metal-reinforced plastics material profile (extruded or rolled section) which is provided with a metal base and a plastics material covering enclosing it on all sides with the exception of the contact surfaces.

This rail may be mounted directly on a wall surface; it may be mounted from the open longitudinal side of the rail, or with spacing from a surface, or on a ceiling.

The current distributor rail in accordance with the invention is of simple structure, of low cost and electrically safe. A particular advantage is that it may be cut to any required length, and the electric conductor made shockproof at the end face. The two end faces of the rail, both when manufactured in fixed lengths and when cut to length, are rendered shockproof by simple and reliable cover means.

Due to its structure and shockproof form, the rail may be laid between one wall and another.

The rail is of compact structure and accommodates an adapter without any parts substantially projecting downward. Due to its construction the rail is very rigid and has a long (corrosion-resistant) life. A furher advantage of the invention is that it may incorporate two independent circuits, so that the current carrying capacity is high. Alternatively the power conductors of the current distributor rail may carry a three-phase current, so that the rail is very versatile. Due to the construction of the rail and the use of an adaptor, it is possible, by detaching or cutting out of one or more adaptors, for any desired portion of a series of rails to be de-energised, a feature which ensures great safety in assembling rails or in any other work done thereon. The current distributor rail of the present invention may be used in a wide variety of situations on account of its economical design, its long life and its great safety.

Embodiments of the invention are illustrated in the accompanying drawings, in which.

Figure 3:
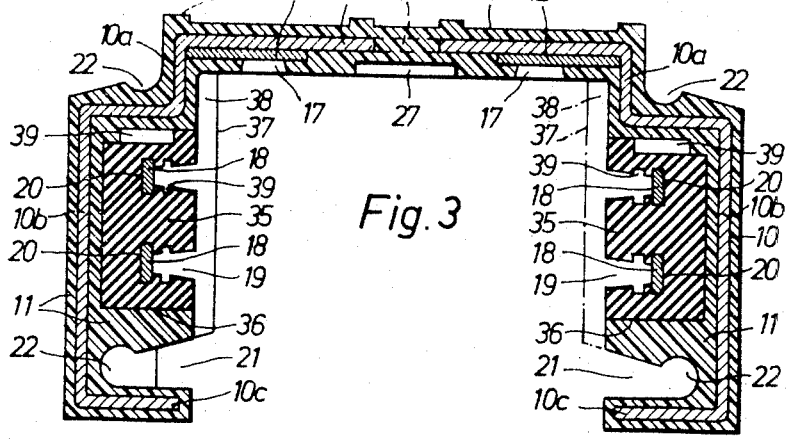
Figure 4:
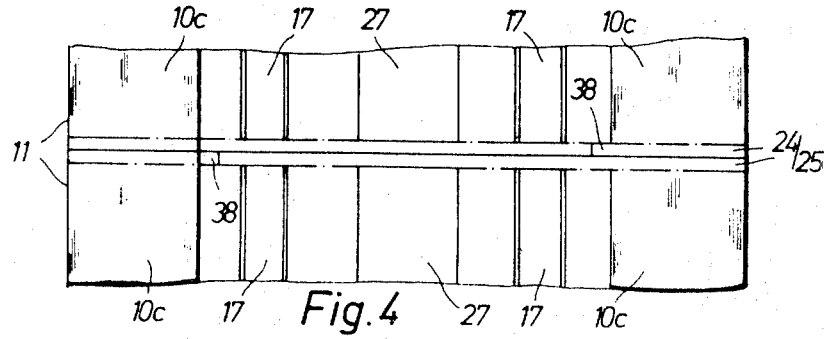
Figure 5:
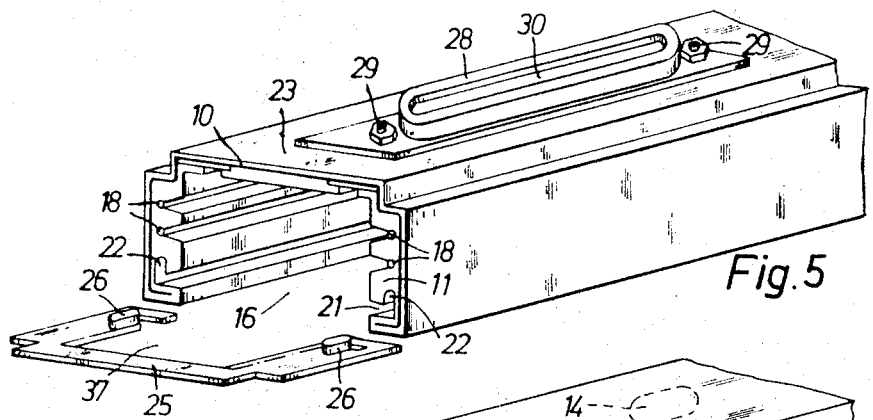
Figure 6:
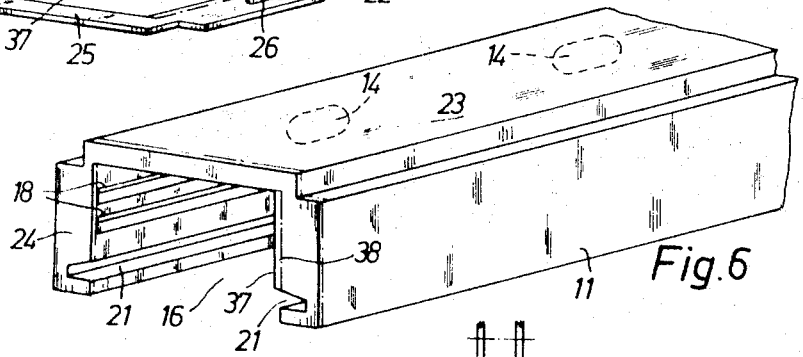
Figure 7:
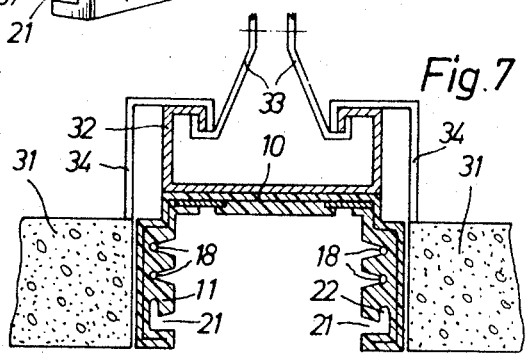

FIG. 3 is a cross section through a current distributor rail with a ceiling or hanging support, FIG. 4 is a view from below of abutting end portions of two current distributor rails, FIG. 5 is a perspective view of a current distributor rail with a protective cover closing the front of the rail, FIG. 6 is a perspective view of a current distributor rail having a plastics covering welded to the ends, FIG. 7 is a cross section through a current distributor rail comprising additional supporting members of plastics material.

Figure 8:
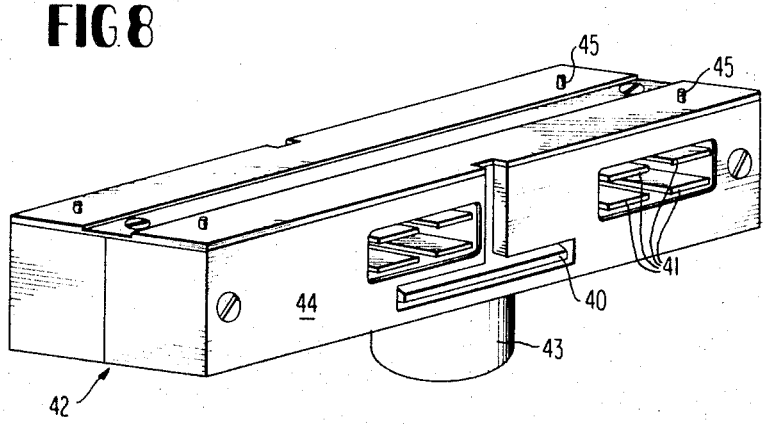

FIG. 8 shows an adapter which may be used with the present invention.

A current distributor rail for current consuming devices such as lamps or electrical apparatus is formed as a metal-reinforced plastics shape, having a metal base 10 which extends over the entire length of the rail and is covered with a plastics material 11.

This metal base 10 serves to reinforce the plastics shape and is of C-shaped cross section.

A current distributor rail may be secured in direct contact with a locating surface (a ceiling or wall) by means of securing members such as screws 15, or may be spaced from the locating surface. The plastic covering 11 is provided with an inner groove 27 extending over the entire length of the rail so that the heads of the screws do not project into the interior 16 of the rail.

The termination 24 has a cover 25 affixed thereto or an adhesive connection welded or cemented thereon, the cover or connection covering the end faces of the conductors 12, 18 and thus preventing contact with the conductors for safety. The cover means are provided over their entire length with a rail 10, 11 having a constant cross-section and with conductors 18, 12, thereby allowing the distributor rail to be cut into any desired length whilst ensuring electrical safety.

It is not necessary for the cover means to cover more than the ends of the conductors 18, 12 and thus they do not have to overlap the entire cross-section of the rail.

A locating groove 21 in the cover means is formed as a longitudinal extension of the locating groove 21 formed in the rail.

For the suspended mounting of the rail, suspension rods or tubes (not shown), are provided which can be secured at one end to a securing and compensating member 28 (see FIG. 5), connected to the upper portion of the distributor rail. This securing and compensating member 28 is secured by means of bolts 29 to the distributor rail, the bolts extending though the slots 14 in the rail. The suspension members (tubes or rods) engage in a slot 30 of the member 28 extending in the longitudinal direction of the rail so that the rail may be secured with an adjusting action in the longitudinal direction of the rail.

Alternatively, the rail may be suspended from a securing surface by clamp-like securing means (not shown) engaging directly in the openings 14.

FIG. 7 of the drawings shows an arrangement of a current distributor rail located between ceiling divisions 31. The rail is secured to a supporting profile 32 mounted in the region 10d of the rail and having a U-shaped cross-section. The profile 32 may be secured to the mounting surface directly or by means of suspended securing means 33. The parts of the ceiling 31 are secured to this supporting profile 32 by means of holding members 34 inserted in the supporting profile 32. The underside of the ceiling parts 31 and of the distributor rail lie flush in one plane.

The additional support profile 32 serves to hold the distributor rail and ceilings 31 together. The distributor rail can be secured in the plaster of a wall of a building.

Current is fed to a distributor rail through an adaptor, which may serve simultaneously as a current supply point and for the electrical connection of a pair of rails.

A whole rail portion may be rapidly and reliably de-energised by separating adjacent rails and by removing interconnecting adaptors.

The plastic covering 11 may be shaped so that the current distributor rail fits a cavity in which it is located.

Figure 1:
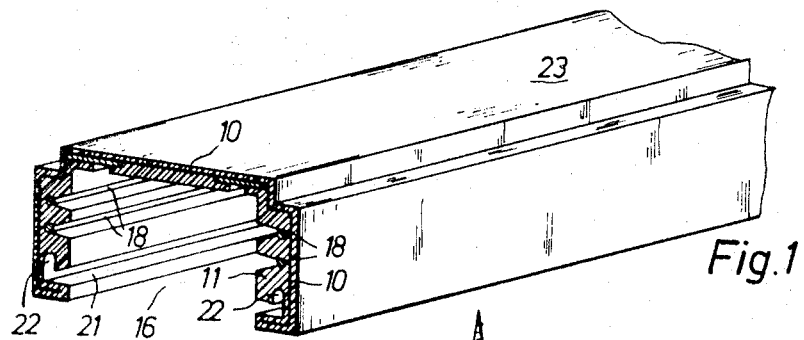
FIG. 1 is a perspective view of a current distributor rail.
Figure 2:
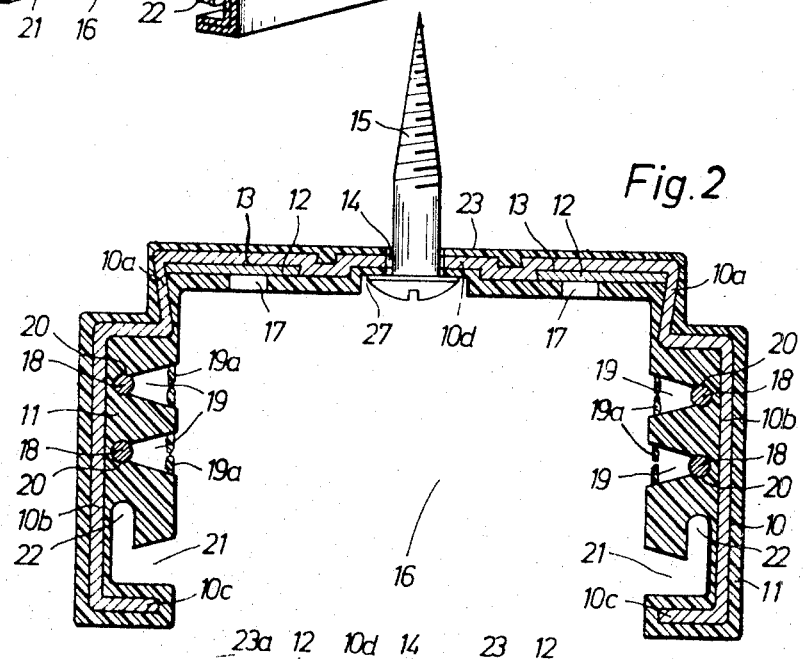
FIG. 2 is a cross section through the same current distributor rail.

The other embodiment shown in FIGS. 3 and 4 of the drawing, relating to a current distributor rail having a metal reinforced plastics profile, corresponds in its basic construction to the rail shown in FIGS. 1 and 2 and may be detachably connected to a surface of a structure.

The distributor rail according to FIG. 3 is provided on each side with a separate plastics support profile 35 holding the two electrical conductors 18. This material is inserted in a receiving space 36 of the plastic covering 11 from the interior 16 of the rail.

The supporting profile 35 holding the electric conductors 18 is secuted by clamping or adhesive in the receiving space 36 of the plastic covering, it is preferable to form each supporting profile 35 with a rectangular (standing on edge) cross-section, and to form it as long as necessary.

These two supporting profiles 35 are inserted, after the rail is made, into the receiving spaces 36 accessible from the receiving space 16 and opening inwards. The two earthing conductors 12 arranged on the upright 10d of the metal base 10 are conductively connected to the base and are secured thereto before the metal base is folded or, without previous securing, held on the base 10 by the plastics covering 11. During the location of the earth conductor 12 it is not necessary to form receiving grooves 13 so that the upright portion 10d, may be provided extending downwardly and outwardly at a right angle to the portion 10d.

The upper rail part 23 is provided at the top with several compensating portions 23a extending in the longitudinal direction of the rail and spaced apart across the rail, these compensating portions 23a providing a good contact with a securing surface for the distributor rail and compensating for irregularities in the securing surface; these compensating members 23a are formed during the production of the plastics covering 11.

The two ends of the current distributor rail are provided near the termination 24 or the cover 25 with an opening 37 (FIGS. 3, 5 and 6) corresponding to the shape of the adaptor to be used. It is preferable to provide the ends of the rail alternately with a lateral fixing bar 38 extending into the inner cavity 37 above the securing groove 21. At one end of the distributor rail the bar 38 is provided on one side of the opening and at the other end of the rail on the opposite side of the opening, the opening 37 is thus asymmetrical. The two fixing bars 38 extend from the upper edge of the particular securing groove 21 as far as the upper edge of the receiving space 16 and make it possible to locate an adaptor in the abutting area of adjacent distributor rails, so that a connection between the power conductors 18 of adjacent rails is ensured by the adaptor. The adaptor is provided with relatively displaced fixing grooves in the longitudinal direction, corresponding to the projecting fixing members 38.

The termination 24 or the protective cover 25 is shaped in the region of the fixing grooves 21 to the cross sectional size of the locking members retaining the adaptor in the rail, so that only the recess 22 adjacent to the fixing groove 21 is covered; the adaptor locking members partially engage in the two adjacent distributor rails and simultaneously bring them into alignment.

In addition to the recesses 22 for holding the protective cover, another recess may be provided in the upper lateral portion of the rail (near the rail projection 23) which recess opens outwardly in the region of the outer plastics covering.

The cross section of this recess 22 may be circular, oval or U-shaped.

Near the insertion openings 19 and in the region between the bend 10a and the power conductor 18 adjacent thereto, grooves 39 are formed to increase leadkage current paths.

The insertion openings 19 of the distributor rail are closed by means of flexible sealing lips 19a at the opening end (FIG. 2); the sealing lips 19a form a unit with the plastics covering 11.

The closing lips 19a extend along the upper and lower insertion edges of the openings 19 and are directed towards each other; each insertion opening 19 for the electrical leads 18 is provided with two oppositely disposed lips 19a, closing the opening 19 from the cavity 16.

The sealing lips 19a are pressed into the insertion opening 19 by the electrical terminals of the adaptor when said adaptor is positioned, and then return to a closed position. These lips 19 extend over the entire length of the rail and keep the openings 19 closed except near an adaptor, so that adequate protection to the power conductors is ensured.

The sealing lips 19a may be formed as brushes which are rigidly or detachably arranged in the plastics covering 11. Alternatively the sealing lips 19a are formed of separate parts such as strips, which can be detachably secured in the region of the insertion openings 19 on the plastics covering 11.

FIG. 8 shows an adapter which may be used with the present invention. This adapter is merely exemplary of adapters of this general type.

Referring to FIG. 8, locking parts 40 and electrical connectors 41 of adapter 42 are movable by the rotation of shaft 43 so that they extend from the housing 44 to engage fixing groove 21 and conductors 18 respectively. The adapter is inserted in receiving space 16 of the rail when 40 and 41 are withdrawn to be within housing 44. After insertion, shaft 43 is rotated, thus extending 40 and 41 to hold the adapter in the rail and to make the electrical connection to the conductors 18. Projections 45 pass through slots 17 to engage conductors 12 and 13.

Alternatively only one sealing lip 19a may be provided covering the insertion side of the opening 19.

The rail may be produced in fixed or optional lengths or, may be cut to any desired length and is thus always ready for installation.

The current distributor rail may be laid from wall to wall. Electrical connection with a plurality of rails is simple and reliable.

The mounting of the rail is preferably effected from the open longitudinal side of the rail.

I claim:
1. A current distributor rail for electrical appliances comprising a rail member body having a receiving space for an adapter, the body further having a plurality of electric current conductors and at least one ground conductor, and cover means for covering at least the electric current conductors, the cover means covering the entire cross-secitonal area of the rail member body and being provided with an aperture corresponding to the outer shape of the adapter with oppositely located fixing grooves for mounting the adapter, the outer shape being substantially that of the outer cross section of the rail member body.

2. A current conductor rail as recited in claim 1 wherein said cover means includes a lateral fixing rib extending into the receiving space of said rail above said fixing groove.

3. A current distributor rail as recited in claim 2 wherein said fixing rib extends from the top of the receiving space to the fixing groove.

4. A current distributor rail for electrical applicances comprising a rail member adapted to be severed to any required length and having a constant cross-section over its whole length, an adapter, said rail member defining a receiving space for an adapter which is open at one end of said rail member, said receiving space having two opposite fixing grooves exending over the whole length of said rail member for mounting said adapter and at least two oppositely located electric conductors respectively adjacent the fixing grooves extending over the whole length of said rail member, at least one earthing conductor being accessible for tapping current from said receiving space, said adapter fixed to said rail member and capable of interconnecting other similar rails and cover means covering both ends of said rail member and covering said conductors to insulate them wherein the cover means includes a lateral fixing rib extending into the receiving space of said rail member above the fixing groove.

5. A current distributor rail as recited in claim 4 wherein said cover means includes fixing projections for engaging end face recesses in said rail members and wherein said cover means are detachable from said rail member.

6. The current distributor rail as recited in claim 5 wherein said end face recesses are adjacent to said fixing grooves.

7. A current distributor rail for electrical appliances comprising a rail member adapted to be severed to any required length and having a constant cross-section over its whole length, an adapter, said rail member defining a receiving space for an adapter which is open at one end of said rail member, said receiving space having two opposite fixing grooves extending over the whole length of said rail member for mounting said adapter and at least two oppositely located electric conductors respectively adjacent the fixing grooves extending over teh whole length of said rail member, at least one earthing conductor being accessible for tapping current from said receiving space, said adapter fixed to said rail member and capable of interconnecting other similar rails and a cover means capable of covering at least one end face of said rail member and covering said conductors to insulate them wherein said cover means covers the whole cross-sectional area of said rail member and includes an aperture corresponding to the shape of said adapter and having oppositely located fixing grooves for the adapter mounting, the outer shape of the cover means being substantially the same as the rail member.

8. A current distributor rail according to claim 7, wherein said cover means are provided with said fixing grooves which have an inclined or arcuate clamping surface, and which are identical in their cross-section shape with the fixing grooves of the rail member and extend in the same direction.

* * * * *